(No Model.)
R. SWORD.
STOVEPIPE JOINT.
No. 576,484. Patented Feb. 2, 1897.
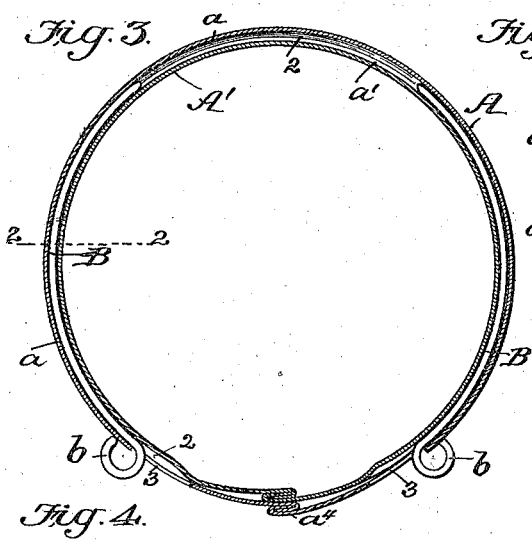
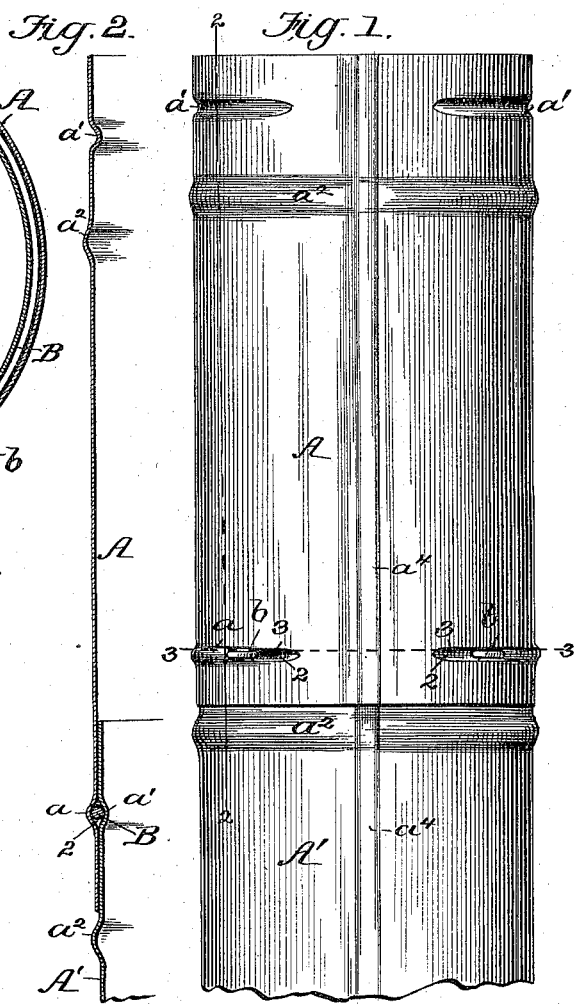
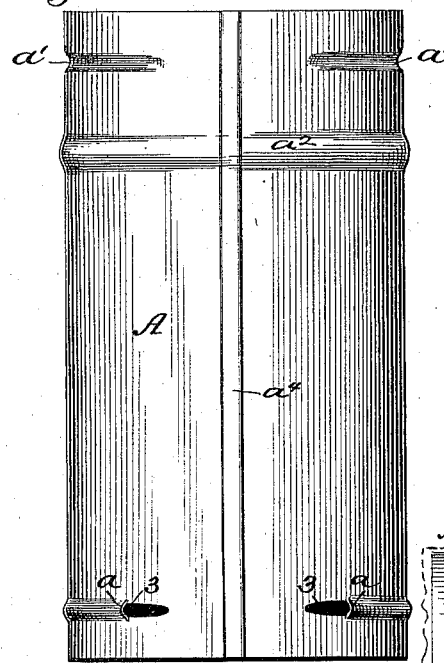
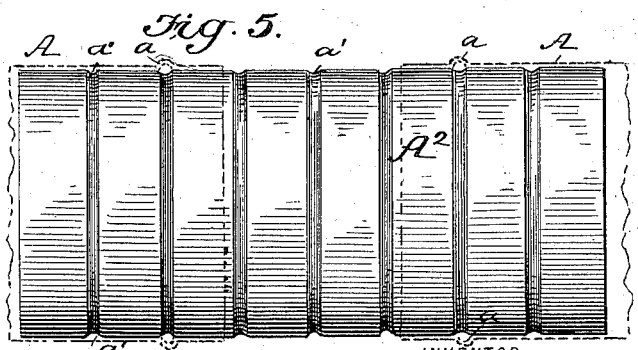
WITNESSES:
Jos. A. Ryan.
Edw. W. Byrn.
INVENTOR
Robert Sword.
BY Munn & Co.
ATTORNEYS.

UNITED STATES PATENT OFFICE.

ROBERT SWORD, OF BRANDON, CANADA, ASSIGNOR OF ONE-THIRD TO WILLIAM HENRY HELLYAR, OF SAME PLACE.

STOVEPIPE-JOINT.

SPECIFICATION forming part of Letters Patent No. 576,484, dated February 2, 1897.

Application filed August 12, 1896. Serial No. 602,528. (No model.) Patented in Canada April 24, 1896, No. 52,089.

*To all whom it may concern:*

Be it known that I, ROBERT SWORD, of Brandon, Manitoba, Canada, have invented a new and useful Improvement in Stovepipe-Joints, (for which I have already obtained a patent in Canada, dated April 24, 1896, No. 52,089,) of which the following is a specification.

The object of my invention is to provide a lock for stovepipe-joints which may be readily applied or removed and which while in position will prevent the parting of the joint.

Figure 1 is an elevation of a couple of stovepipe-sections joined together and provided with my improved lock. Fig. 2 is a longitudinal section of the same on line 2 2, Figs. 1 and 3, on a larger scale. Fig. 3 is a transverse section of the same on line 3 3, Fig. 1, on a larger scale. Fig. 4 is an elevation of a single pipe or length, and Fig. 5 is a pipe or length provided with a series of lock-grooves.

A and A' are two stovepipe-sections similar to one another and only distinguished by their different positions, the one being overlapped or telescoped by the other at the joint.

The joint may, as usual, be marked by a bead $a^2$ near one end. Between this bead and the end of the pipe is formed a circular groove $a'$, nearly extending to the seam $a^4$. A corresponding groove $a$, registering with the groove $a'$, is formed on the interior of the lower end of the overlapping pipe A, so that the two grooves facing each other form an annular recess 2, extending around and between two pipes from a place near the seams adapted to receive a wire. The groove $a$ in the outer or upper pipe forms a bead on the outer surface, and an orifice or opening 3 is provided at each end near the seam, giving access to said annular groove 2.

B B are wires bent to the curvature of the pipes and provided with scrolls $b$ at one end to serve as handles, each wire something less in length than one-half the length of the annular grooves 2 and inserted through the openings 3. These form the keys, as shown in Fig. 3, their handles being visible in Fig. 1.

It will be seen that when two pipes are put together the keys B may be inserted through the openings 3 as soon as the grooves $a$ and $a'$ are brought opposite each other and the recess 2 is formed. When the keys are in position, approximately filling the space 2 in cross-section, the pipes cannot move longitudinally on each other and are locked together and prevented from separating. The groove $a$ will supply the place of a bead, so far as appearance is concerned, and nothing will prevent the formation of another bead on the inside of the outer pipe for the end of the inner one to abut against, if so desired.

As in fitting up a line of piping its length cannot be regulated by making some or each of the joints a little longer or shorter, pipes, such as $A^2$, may be made having grooves $a'$ at intervals along its whole length, as shown in Fig. 5. This pipe will telescope, so that the key can be applied at the proper place to give the height or length required. When such a section $A^2$ is to be used in connection with a line of piping, the ordinary pipe-sections A A on opposite sides of the many-grooved sections are reversed, so that only the grooves $a$ of the ordinary sections A cooperate with the grooves $a'$ of the adjustable section $A^2$, as shown by dotted lines in Fig. 5.

I am aware that metal tubes have been locked at their joints by a wire permanently embedded in grooves between the overlapping or telescoping ends, and I therefore only claim a stovepipe made of sections in which these grooves are previously formed and provided with outlets adapted to receive curved and detachable locking-keys to be inserted or removed to lock or disconnect the sections at will, and also supplementary sections for adjusting the length of the stovepipe.

Having thus described my invention, what I claim as new, and desire to secure by Letters Patent, is—

1. In a stovepipe lock-joint, the stovepipe-section having at one end an external inwardly-depressed circular groove, and at the other end an outwardly-raised circular groove with outlet or openings cut through the metal of the pipe, one end of each pipe-section being adapted to fit telescopically within the opposite end of the next pipe-section and adapted to receive a curved locking key or keys within the coinciding grooves substantially as and for the purpose described.

2. In a stovepipe lock-joint, the combination of the stovepipe-sections having each at one end an external inwardly-depressed circular groove, and at the other end an outwardly-raised circular groove with outlets or openings cut through the metal of the pipe, one end of each pipe-section being adapted to fit telescopically within the opposite end of the next pipe-section, and two curved locking-keys arranged within the coinciding grooves and provided with handles upon the outside substantially as and for the purpose described.

3. A stovepipe-section having a series of circular parallel grooves around it throughout its length, in combination with stovepipe-sections having each at one end an outwardly-pressed internal groove with openings cut through the pipe at the ends thereof, and curved locking-keys fitting within the coinciding grooves and having external handles substantially as and for the purpose described.

ROBERT SWORD.

Witnesses:
JOHN M. BROWN,
WILLIAM WALKER.